(12) United States Patent
Costales

(10) Patent No.: US 6,546,208 B1
(45) Date of Patent: Apr. 8, 2003

(54) STEREOSCOPIC TELESCOPE WITH CAMERA

(75) Inventor: Bryan L. Costales, Boulder, CO (US)

(73) Assignee: SL3D, Inc., Boulder, CO (US)

( * ) Notice: Subject to any disclaimer, the term of this patent is extended or adjusted under 35 U.S.C. 154(b) by 0 days.

(21) Appl. No.: 09/721,046

(22) Filed: Nov. 22, 2000

Related U.S. Application Data

(60) Provisional application No. 60/166,902, filed on Nov. 22, 1999, and provisional application No. 60/180,038, filed on Feb. 3, 2000.

(51) Int. Cl.$^7$ .............................................. G03B 35/00
(52) U.S. Cl. ..................... 396/324; 396/432; 396/327; 359/462; 359/466; 359/464
(58) Field of Search ................. 396/432, 324, 396/325; 359/407, 423, 462, 464, 465, 466; 348/42, 49, 54; 378/41; 353/7, 20, 8

(56) References Cited

U.S. PATENT DOCUMENTS

| 2,255,631 A | 9/1941 | Schulman | 88/39 |
|---|---|---|---|
| 2,639,653 A | 5/1953 | Fischer | 95/18 |
| 3,626,828 A | 12/1971 | Lindsey | 396/324 |
| 3,665,184 A | 5/1972 | Schagen | 378/41 |
| 3,712,199 A | 1/1973 | Songer, Jr. | 95/18 |

(List continued on next page.)

FOREIGN PATENT DOCUMENTS

| GB | 2298989 | * 7/1997 | |
|---|---|---|---|
| JP | 58166869 | 10/1983 | H04N/1/12 |
| JP | 1296215 | 11/1989 | G02B/27/26 |
| JP | 5007373 | * 1/1993 | |
| JP | 5011373 | 1/1993 | G03B/35/08 |

(List continued on next page.)

OTHER PUBLICATIONS

U.S. patent application Ser. No. 09/980,524, Costales, filed Jul. 13, 2000.
U.S. patent application Ser. No. 09/893,720, Costales, filed Jul. 28, 2001.
U.S. patent application Ser. No. 09/664,084, Costales. filed Sep. 18, 2000.
U.S. patent application Ser. No. 09/565,662, Costales, filed May 05, 2000.
van Egmond; "3D Photography Through The Microscope"; *Microscopy UK—Micscape Article*; 1997; pps. 1–3.
Paper by Feris; "Novel 3–D Stereoscopic Image Technology"; *Proceedings of the International Society of Optical Engineers SPIE*; Apr. 1994; vol. 2177.
Paper by Hemayed et al.; "Investigation of Stereo–based 3D Surface Reconstruction"; *Proceedings of SPIE Three Dimensional Image Capture*; Mar. 1997; vol. 3023.
Paper by Udupa; "3D Imaging : Where do we stand?"; *SPIE Proceedings International Symposium on multispectral Image processing*; Sep. 1998; vol. 3545.
Paper by Carter; "The advantage of single lens stereopis"; *SPIE Proceedings of Stereoscopic Displays and Applications II*; 1992; vol. 1669.
Paper by Carter; "Single Lens Stereoscopy: A (sic) Historical and Technical Review"; *SPIE Proceedings Stereoscopic Display and Virtual Reality Systems III*; Apr. 1996; vol. 2633.
Paper by Weissman; "Stereo Parallax and Disparity in Single–Lens Stereoscopy"; *Proceedings of SPIE*; vol. 3957 (2000) pps. 312–317.

*Primary Examiner*—Della Rutledge
(74) *Attorney, Agent, or Firm*—Sheridan Ross P.C.

(57) ABSTRACT

The optical device of the present invention is able to capture a three-dimensional image via one or more imaging devices while permitting the viewer to view the object(s) during image acquisition. The user is thereby able to adjust the orientation of the optical device to obtain the desired image.

39 Claims, 4 Drawing Sheets

U.S. PATENT DOCUMENTS

| | | | |
|---|---|---|---|
| 3,876,283 A | 4/1975 | Judd | 350/87 |
| 3,959,804 A | 5/1976 | Rochwite | 396/328 |
| 4,021,846 A | 5/1977 | Roese | 358/92 |
| 4,072,967 A | 2/1978 | Dudley | 354/79 |
| 4,180,313 A | 12/1979 | Inuiya | 396/330 |
| 4,189,210 A | 2/1980 | Browning et al. | 350/132 |
| 4,222,653 A | 9/1980 | Beiser | 396/324 |
| 4,240,731 A | 12/1980 | Staffieri | 396/327 |
| 4,287,420 A | 9/1981 | Yamamura | 378/41 |
| 4,290,675 A | 9/1981 | Beiser | 354/112 |
| 4,303,316 A | 12/1981 | McElveen | 352/57 |
| 4,568,160 A | 2/1986 | Krueger | 352/86 |
| 4,578,802 A | 3/1986 | Itoh | 378/41 |
| 4,583,117 A | 4/1986 | Lipton | 348/47 |
| 4,601,551 A | 7/1986 | Pettingell et al. | 350/525 |
| 4,651,201 A | 3/1987 | Schoolman | 359/98 |
| 4,712,226 A | 12/1987 | Horbaschek | 378/134 |
| 4,725,863 A | 2/1988 | Dumbreck | 396/325 |
| 4,761,066 A | 8/1988 | Carter | 350/510 |
| 4,769,701 A | 9/1988 | Sklebitz | 378/42 |
| 4,819,255 A | 4/1989 | Sato | 378/42 |
| 4,844,583 A | 7/1989 | Lo | 359/464 |
| 4,862,873 A | 9/1989 | Yajima et al. | 128/6 |
| 4,896,966 A | 1/1990 | Boisseau et al. | 356/442 |
| 5,065,236 A | 11/1991 | Diner | 348/54 |
| 5,073,914 A | 12/1991 | Asahina | 378/42 |
| 5,090,038 A | 2/1992 | Asahina | 378/41 |
| 5,115,339 A | 5/1992 | Martino et al. | 359/384 |
| 5,155,750 A | 10/1992 | Klynn | 378/42 |
| 5,222,477 A | 6/1993 | Lia | 128/6 |
| 5,233,639 A | 8/1993 | Marks | 378/42 |
| 5,251,635 A | 10/1993 | Dumoulin | 600/417 |
| 5,264,925 A | 11/1993 | Shipp et al. | 358/44 |
| 5,313,239 A | 5/1994 | Mizukawa | 396/471 |
| 5,319,417 A | 6/1994 | Hahm | 355/22 |
| 5,396,890 A | 3/1995 | Weng | 600/443 |
| 5,471,237 A | 11/1995 | Shipp | 348/46 |
| 5,539,572 A | 7/1996 | Greenberg et al. | 359/368 |
| 5,557,454 A | 9/1996 | Takahashi | 359/378 |
| 5,581,314 A | 12/1996 | Yoneyama | 396/331 |
| 5,592,328 A | 1/1997 | Greenberg | 359/389 |
| 5,606,363 A | 2/1997 | Songer | 348/49 |
| 5,608,849 A | 3/1997 | King, Jr. | 345/419 |
| 5,671,007 A | 9/1997 | Songer | 348/49 |
| 5,682,895 A | 11/1997 | Ishiguro | 660/440 |
| 5,694,142 A | 12/1997 | Dumoulin | 345/9 |
| 5,701,532 A | 12/1997 | Inaba | 396/326 |
| 5,703,677 A | 12/1997 | Simoncelli | 356/404 |
| 5,706,128 A | 1/1998 | Greenberg | 359/385 |
| 5,715,489 A | 2/1998 | Inaba | 396/327 |
| 5,724,435 A | 3/1998 | Malzbender | 382/103 |
| 5,724,561 A | 3/1998 | Tarolli | 395/523 |
| 5,729,781 A | 3/1998 | Warren | 396/325 |
| 5,731,894 A * | 3/1998 | Gross | 359/386 |
| 5,737,655 A | 4/1998 | Inaba | 396/324 |
| 5,743,847 A * | 4/1998 | Nakamura et al. | 600/166 |
| 5,745,163 A * | 4/1998 | Nakamura et al. | 348/46 |
| 5,751,341 A * | 5/1998 | Chaleki et al. | 348/65 |
| 5,787,889 A | 8/1998 | Edwards | 600/443 |
| 5,793,341 A | 8/1998 | Omori | 345/8 |
| 5,805,205 A * | 9/1998 | Songer | 348/49 |
| 5,825,539 A | 10/1998 | Hoshi | 359/462 |
| 5,825,541 A | 10/1998 | Imai | 359/464 |
| 5,828,487 A * | 10/1998 | Greening et al. | 359/466 |
| 5,831,765 A | 11/1998 | Nakayama | 359/464 |
| 5,832,325 A | 11/1998 | Ito | 396/326 |
| 5,835,264 A * | 11/1998 | Tandler | 359/377 |
| 5,855,425 A | 1/1999 | Hamagishi | 353/7 |
| 5,865,829 A * | 2/1999 | Kitajima | 359/351 |
| 5,867,312 A * | 2/1999 | Greenberg | 359/390 |
| 5,875,005 A | 2/1999 | Morishima | 359/462 |
| 5,880,883 A | 3/1999 | Sudo | 359/462 |
| 5,886,816 A | 3/1999 | Faris | 359/464 |
| 5,892,994 A | 4/1999 | Inaba | 396/390 |
| 5,900,972 A | 5/1999 | Chikazawa | 359/464 |
| 5,907,434 A * | 5/1999 | Sekine et al. | 348/335 |
| 5,914,810 A * | 6/1999 | Watts | 359/464 |
| 5,926,318 A | 7/1999 | Herbert | 359/618 |
| 5,943,166 A | 8/1999 | Hoshi | 359/464 |
| 5,953,156 A | 9/1999 | Muench | 359/464 |
| 5,964,696 A * | 10/1999 | Mihalca et al. | 600/166 |
| 5,975,703 A | 11/1999 | Holman | 353/20 |
| 5,982,538 A | 11/1999 | Shikama | 359/465 |
| 5,991,074 A | 11/1999 | Nose | 359/465 |
| 5,991,098 A | 11/1999 | Pareto | 359/718 |
| 5,993,004 A | 11/1999 | Moseley | 353/8 |
| 6,020,993 A * | 2/2000 | Greenberg | 359/363 |
| 6,038,071 A | 3/2000 | Chikazawa | 359/464 |
| 6,061,179 A | 5/2000 | Inoguchi | 359/464 |
| 6,081,372 A | 6/2000 | Mura | 359/377 |
| 6,139,490 A | 10/2000 | Breidenthal et al. | 600/111 |
| 6,151,164 A * | 11/2000 | Greening et al. | 359/466 |
| 6,271,895 B2 * | 8/2001 | Takagi et al. | 345/7 |
| 6,275,335 B1 | 8/2001 | Costales | 359/464 |
| 6,320,696 B1 * | 11/2001 | Greenberg et al. | 359/363 |

FOREIGN PATENT DOCUMENTS

| | | | | |
|---|---|---|---|---|
| JP | 5040319 | 2/1993 | | G03B/35/00 |
| JP | 5045750 | 2/1993 | | G03B/35/08 |
| JP | 5045751 | 2/1993 | | G03B/35/08 |
| JP | 5158168 | 3/1993 | | G03B/35/10 |
| JP | 5091979 | 4/1993 | | A61B/3/24 |
| JP | 5107481 | 4/1993 | | G02B/21/22 |
| JP | 5123299 | 5/1993 | | A61B/3/14 |
| JP | 5127068 | 5/1993 | | G02B/7/28 |
| JP | 5158169 | 6/1993 | | G03B/35/10 |
| JP | 5158170 | 6/1993 | | G03B/35/10 |
| JP | 5164974 | 6/1993 | | G02B/21/22 |
| JP | 5188497 | 7/1993 | | G03B/35/00 |
| JP | 5197045 | 8/1993 | | G03B/35/10 |
| JP | 5245109 | 9/1993 | | A01B/3/14 |
| JP | 8240778 A * | 9/1993 | | |
| JP | 5288532 | 11/1993 | | G01B/11/24 |
| JP | 5336548 | 12/1993 | | H04N/13/02 |
| JP | 5341206 | 12/1993 | | G02B/23/24 |
| JP | 5344997 | 12/1993 | | A61F/9/00 |
| JP | 6067321 | 3/1994 | | G03B/35/08 |
| JP | 6095276 | 4/1994 | | G03B/35/08 |
| JP | 6324413 | 11/1994 | | G03B/35/10 |
| JP | 6339155 | 12/1994 | | H04N/13/02 |
| JP | 7020388 | 1/1995 | | G02B/23/26 |
| JP | 7030926 | 1/1995 | | H04N/13/00 |
| JP | 7064216 | 3/1995 | | G03B/35/08 |
| JP | 7077747 | 3/1995 | | G03B/35/08 |
| JP | 7152097 | 6/1995 | | G03B/35/08 |
| JP | 7199078 | 8/1995 | | G02B/21/00 |
| JP | 7209775 | 8/1995 | | G03B/35/10 |
| JP | 7234460 | 9/1995 | | G03B/35/00 |
| JP | 7289543 | 11/1995 | | A61B/6/02 |
| JP | 7296165 | 11/1995 | | G06T/7/00 |
| JP | 8021958 | 1/1996 | | G02B/21/22 |
| JP | 8095176 | 4/1996 | | G03B/35/26 |
| JP | 8111874 | 4/1996 | | H04N/13/02 |
| JP | 8140116 | 5/1996 | | H04N/13/00 |
| JP | 8152561 | 6/1996 | | |
| JP | 8171151 | 7/1996 | | G02B/35/08 |
| JP | 8184762 | 7/1996 | | G02B/21/22 |
| JP | 8194170 | 7/1996 | | G02B/23/24 |
| JP | 8196509 | 8/1996 | | A61B/3/14 |
| JP | 8201699 | 8/1996 | | G02B/21/18 |
| JP | 8215142 | 8/1996 | | A61B/1/04 |

| | | | | | | | | |
|---|---|---|---|---|---|---|---|---|
| JP | 8223606 | 8/1996 | ........... H04N/13/02 | WO | WO 97/01245 | 1/1997 | ............ H04N/7/14 |
| JP | 8304707 | 11/1996 | ........... G02B/21/22 | WO | WO 97/31566 | 2/1997 | ............ A61B/3/10 |
| JP | 8317427 | 11/1996 | ........... H04N/13/04 | WO | WO 97/22020 | 6/1997 | ............ G02B/3/04 |
| JP | 8328171 | 12/1996 | ........... G03B/35/04 | WO | WO 97/27798 | 8/1997 | |
| JP | 6015510 | 1/1997 | ........... G02B/21/22 | WO | WO 97/31305 | 8/1997 | |
| JP | 9005632 | 1/1997 | ........... G02B/21/12 | WO | WO 97/37582 | * 10/1997 | |
| JP | 9026635 | 1/1997 | ........... G03B/35/08 | WO | WO 98/14819 | 4/1998 | ........... G92B/27/22 |
| JP | 9215012 | 8/1997 | ........... H04N/13/02 | WO | WO 98/17169 | 4/1998 | |
| JP | 9224266 | 8/1997 | ........... H04N/13/02 | WO | WO 98/25172 | 6/1998 | |
| JP | 9224267 | 8/1997 | ........... H04N/13/04 | WO | WO 98/25414 | 6/1998 | ......... H04N/13/04 |
| JP | 9318882 | 12/1997 | ........... G02B/21/22 | WO | WO 98/33085 | 7/1998 | ........... G02B/27/22 |
| JP | 10010438 | 1/1998 | ........... G02B/21/22 | WO | WO 98/34149 | 8/1998 | ........... G02B/27/22 |
| JP | 10023467 | 1/1998 | ........... H04N/13/02 | WO | WO 99/90449 | 8/1998 | ........... G02B/27/22 |
| JP | 10039434 | 2/1998 | ........... G03B/35/02 | WO | WO 98/47097 | 10/1998 | |
| JP | 10048535 | 2/1998 | ........... G02B/23/24 | WO | WO98/48313 | 10/1998 | |
| JP | P10048538 A2 * | 2/1998 | | WO | WO 98/48313 | 10/1998 | |
| JP | 10062697 | 3/1998 | ........... G02B/23/26 | WO | WO 99/06950 | 2/1999 | |
| JP | 10066106 | 3/1998 | ........... H04N/13/02 | WO | WO 99/08586 | 2/1999 | ........... A61B/1/005 |
| JP | 10090812 | 4/1998 | ........... G03B/35/04 | WO | WO 99/11073 | 3/1999 | ........... H04N/13/00 |
| JP | 10096867 | 4/1998 | | WO | WO 99/17555 | 4/1999 | ........... H04N/13/02 |
| JP | 10105692 | 4/1998 | ............. G06T/1/00 | WO | WO 99/23522 | 5/1999 | |
| JP | 10108219 | 4/1998 | ........... H04N/13/00 | WO | WO 99/23937 | 5/1999 | |
| JP | 10155165 | 6/1998 | ........... H04N/13/02 | WO | WO 99/27843 | 6/1999 | |
| JP | 10191395 | 7/1998 | ........... H04N/13/02 | WO | WO 99/30508 | 6/1999 | ......... H04N/13/000 |
| JP | 10254079 | 9/1998 | ........... G03B/35/02 | WO | WO 99/34300 | 7/1999 | ........... G06F/15/00 |
| JP | 10268207 | 9/1998 | ........... G02B/21/22 | WO | WO 99/47949 | 9/1999 | |
| JP | 10282592 | 10/1998 | | WO | WO 00/22458 | 10/1999 | |
| JP | 11008863 | 1/1999 | ........... H04N/13/02 | WO | WO 00/23845 | 10/1999 | |
| JP | 10104525 | 4/1999 | ........... G02B/21/22 | WO | WO 99/60525 | 11/1999 | ............. G06T/7/00 |
| JP | 11178012 | 7/1999 | ........... H04N/13/02 | WO | WO 00/36845 | 12/1999 | ........... H04N/13/02 |
| JP | 11205818 | 7/1999 | ........... H04N/13/00 | WO | WO 99/60916 | 12/1999 | |
| JP | 11206714 | 8/1999 | ............ A61B/3/14 | WO | WO 99/63388 | 12/1999 | ........... G02B/27/00 |
| JP | 11271625 | * 10/1999 | | WO | WO 99/65249 | 12/1999 | ........... H04N/13/00 |
| JP | 11285025 | 10/1999 | ........... H04N/13/02 | WO | WO 00/23845 | 4/2000 | |
| JP | 11298917 | 10/1999 | ........... H04N/13/02 | WO | WO 00/35200 | 6/2000 | ............ H04N/7/18 |
| JP | 11341522 | 10/1999 | ........... H04N/13/02 | WO | WO 00/36372 | 6/2000 | |
| JP | 11326784 | 11/1999 | ........... G02B/23/24 | WO | WO 01/06282 | 1/2001 | |
| JP | 11344778 | 12/1999 | ........... G03B/35/08 | | | | |
| WO | WO 87/04263 | * 7/1987 | | * cited by examiner | | | |
| WO | WO 97/43681 | 11/1987 | ........... G02B/27/22 | | | | |

STEREOSCOPIC TELESCOPE WITH CAMERA

CROSS-REFERENCE TO RELATED APPLICATIONS

The present application claims priority under 35 U.S.C. Section 119(e) to U.S. Provisional Application Serial No. 60/166,902, of the same title, filed Nov. 22, 1999, and U.S. Provisional Patent Application Serial No. 60/180,038, filed Feb. 3, 2000, all of which are incorporated herein by reference.

FIELD OF THE INVENTION

The present invention is directed generally to stereoscopic devices and specifically to a stereoscopic telescope.

BACKGROUND OF THE INVENTION

Stereoscopic optical devices are becoming increasingly important not only to consumers but also to professionals in a broad variety of applications. By way of example, in still photography and video stereoscopic images are generally considered as a highly desirable alternative to two-dimensional images.

In designing a stereoscopic optical device, such as a still camera and/or video recorder, there are a number of important considerations. First, the device should produce a stereoscopic image of high quality. Second, the device should permit the user to visually preview the image(s) being acquired by the device. This feature would help the operator to aim the device for more accurate image acquisition. Finally, the device should be capable of acquiring images of objects having a greater diameter than the lens diameter of the device. Otherwise optical losses would detrimentally impact image quality.

SUMMARY OF THE INVENTION

These and other design considerations are addressed by the present invention. Generally, the optical device of the present invention projects one portion of the image radiation onto one or more imaging devices and another portion of the image radiation onto one or more oculars for two- or three-dimensional viewing by a user. "Image radiation" refers to radiation that has contacted the object and therefore contains image information describing the object. Image radiation is typically light that has been reflected by the object. In this manner, the user is able to preview the object being imaged by the imaging device (i.e., during image acquisition) and adjust the orientation of the optical device as desired for a more desirable image. The optical device can be in any number of configurations, such as a single lens reflex camera, a single lens telescope, and a single lens telephoto video camera.

In one embodiment, the optical device of the present invention includes:

(a) one or more first lenses to project radiation along a first optical path;

(b) at least a first dividing surface for dividing the projected radiation into first and second radiation portions;

(c) at least a second dividing surface for dividing the first radiation portion into first and second radiation segments;

(d) one or more second lenses for focusing the first radiation segment on an imaging surface, the imaging surface being a part of an image acquisition device; and (e) one or more third lenses for focusing the second radiation segment for viewing by a user. Depending on the configuration of the device, the user can see a two- or three-dimensional image of the object.

The first lens(es) can be any suitable lens for gathering image radiation and projecting the gathered radiation along a selected optical path. The first lens(es) can thus be any type or focal length lens. For example, the first lens(es)can be reflector telescope lens(es), refractor telescope lens(es), Schmidt-Cassegrain telescope lens(es), telescopic periscope lens(es), telephoto lens(es), zoom telephoto lens(es), long focal length surveillance lens(es), and other optical classes of telescopic lenses.

The first dividing surface is typically one or more of a reflective surface, a refractive surface, an encoder that causes each of the first and second radiation portions to have a different characteristic (e.g., intensity, phase, wavelength distribution, polarization orientation, color, and/or frequency. In one configuration, the first optical path is transverse to the second and third optical paths and the second and third optical paths are in differing locations. Specific examples of dividing surfaces used in this configuration include a mirror (e.g., a partially silvered mirror, a pair of transversely oriented mirrors, etc.), a prism, and/or a beam splitter. In one configuration, the first optical path is transverse to only one of the second and third optical paths. Specific examples of dividing devices used in this configuration include at least two plane polarizers having differing polarization orientations, at least two circular polarizers having differing handedness, at least two color filters passing differing wavelength bands, at least two (mechanically or opti-electrical) shutters passing radiation at differing intervals, and a retarder covering only a portion of the first optical path. A pair of shutters in some applications is not preferred because the switching speed may be too low to produce a high quality stereoscopic image, particularly when the object being imaged is moving or changing shape.

The second dividing surface is typically a reflective or refractive surface that directs the first and second portions of the first radiation along selected optical paths. In one configuration, the second dividing surface is one or more of a beam splitter, a prism, front silvered mirrors, and/or rear silvered mirrors.

The second and/or third lenses can be any suitable lens or lens system that can project and/or focus the respective portion of the image radiation on the desired surface (which can be the imaging surface or the user's eye). In one configuration, the second and/or third lenses includes a rear-focus conversion lens. In one configuration, the third lenses include an ocular or ocular lens system for focusing the third radiation portion on the user's eye.

The relative positions of certain optical elements can be adjusted to accommodate the user. For example, in one configuration the distance between the rear-focus conversion lens and ocular is adjustable by the user. In one configuration, the second dividing surface, second lens(es), and third lens(es) are movably disposed in the optical device for interocular adjustment (where the optical device has two or more oculars).

The optical device can be any device and/or medium that can acquire or capture an image. For example, the image acquisition device is typically an image orthicon tube, a CCD array, a CMOS array, any other method of recording an image electronically (whether analog or digital), and/or any method of recording photographically such as (cinema or camera) negative or positive film. In one configuration, a plurality of image acquisition devices (typically two) are connected to the optical device to create a plurality of images of the object. The various images can be viewed by traditional techniques to perceive a three-dimensional image. By presenting the two images in sequence, a video or film stream can be created.

The optical device can include other lenses or lens systems and/or other optical elements. In one configuration, the optical device includes a positive and/or negative meniscus positioned between the first lens and the first dividing surface. In one configuration, the optical device includes:

(a) a third dividing surface for dividing the second radiation portion into third and fourth radiation segments, the third and fourth radiation segments following sixth and seventh optical paths, respectively, the sixth and seventh optical paths being transversely oriented;

(b) one or more fourth lenses for focusing the third radiation segment on a second imaging surface, the second imaging surface being a part of a second image acquisition device; and (c) one or more fifth lenses for focusing the fourth radiation segment for viewing by the user. In this configuration, the use of two oculars, each passing differing portions of the image radiation, permits the user to view a three-dimensional image.

The second dividing surface can be configured to activate or deactivate the image acquisition process. For example, the second dividing surface in a first operational mode forms the first and second radiation segments and in a second operational mode does not form the first and second radiation segments. This can be realized by moving the second dividing surface into and out of the optical path of the image radiation.

In another embodiment of the present invention, the optical device includes:

(a) one or more first lenses to project radiation along a first optical path;

(b) at least a first encoder (typically positioned at or near an aperture stop or conjugate thereof) for encoding the projected radiation into first and second radiation portions, the first and second radiation portions having a different characteristic;

(c) at least a first directing surface for directing the first and second radiation portions along second and third optical paths, respectively, the second optical path being transverse to the third optical path;

(d) one or more second lenses for focusing the first radiation portion on an imaging surface, the imaging surface being a part of an image acquisition device; and (e) one or more third lenses for focusing the second radiation portion for viewing by a user.

In another embodiment of the present invention, a method for acquiring a stereoscopic image of an object includes:

(a) passing image radiation, containing image information relating to the object, through at least a first lens of an optical device;

(b) separating the image radiation into first and second radiation portions, wherein at least one of the following is true: (i) the first and second radiation portions traverse different optical paths and (ii) the first and second radiation portions have one or more differing characteristics;

(c) directing at least a portion of the first radiation portion to an imaging surface of an imaging device connected to the optical device; and (d) directing at least a portion of the second radiation portion to an ocular of the optical device for viewing by a user. The method can be employed with any of the optical devices described above as well as with a number of other, differently configured optical devices.

Finally, yet another embodiment of the present invention is directed to an infinity or rear-focus conversion lens that is particularly useful with any of the optical devices set forth above. The lens includes:

(a) a macroscopic front lens element that is able to collect light reflected by an object having a larger dimension than the diameter of the macroscopic first lens element; and (b) a rear lens element that has an at least substantially infinite focal length, whereby the light output by the rear lens element is projected onto a point that is an at least substantially infinite distance from the rear lens element. As used herein, "macroscopic" refers to the reduction of the image acquired to the size of the imaging surface. The macroscopic infinity lens not only permits an optical device using the lens to acquire images having a dimension greater than the infinity lens diameter but also can produce a high quality stereoscopic image due to decreased optical losses. The decreased optical losses or increased optical capture permits the macroscopic infinity lens to capture an image of a higher quality than a conventional microscopic infinity lenses. In one configuration, the optical device can bifurcate the infinity-focused light or signal using prisms, mirrors, polarizers, or signal dividers, such as those described above.

The foregoing summary is neither complete nor exhaustive. As will be appreciated, the foregoing features can be combined or employed in a large number of other devices and/or methodologies. Examples of other devices and/or methodologies that could be modified using one or more of the above features include those described in U.S. patent application Ser. No. 09/354,230, filed Jul. 16, 1999; U.S. Patent Application entitled "Single-Lens Stereoscopic Light-Valves and Apparatuses", filed Sep. 18, 2000, and having Attorney File No. 4446-6-CIP; and U.S. Provisional Patent Application entitled "Single-Lens Stereoscopic Infinity Microscope", to Costales, filed on Nov. 3, 2000, all of which are incorporated herein by reference. Such other devices and/or methodologies are considered to be part of the present invention.

DETAILED DESCRIPTION

Figure 1:
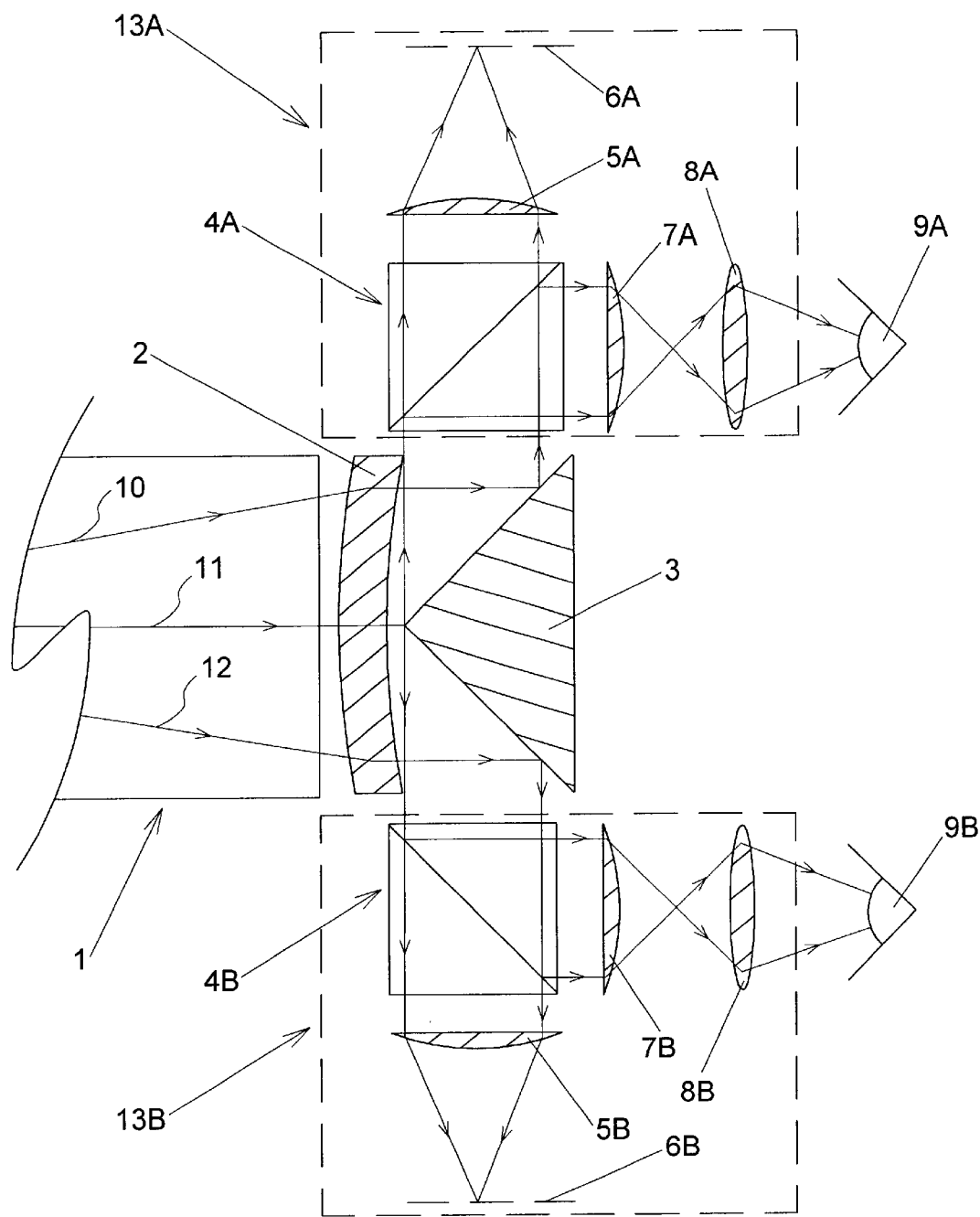
FIG. 1 is a plan view of an optical system according to a first embodiment of the present invention.

FIG. 1 shows diagrammatically and representationally the top view of a Telescope binocular with camera for stereoscopic viewing and image capture. Light is gathered by a telescope system of lenses to project the gathered image through either an eyepiece hole or a camera access hole. Both types of holes are represented by tube 1. The principal ray of the system 11 shows that the light path is bisected by the reflectors or prism 3 causing approximately one half the light image to be reflected to the right and one half to be reflected to the left. The image light path, as indicated by lines 10 and 12, will either diverge as shown for the case of an eyepiece tube, or will converge as for the case of a camera access port. When the image diverges, a negative meniscus 2 is interposed ahead of the prism to columnate the light striking that prism. In the case of a camera access port, a positive meniscus is interposed ahead of the prism to columnate the light striking the prism. The resulting columnated image is split by the prism 3 into two image light paths, one directed to the right (upward on the page) and one directed to the left (downward on the page).

Each image path subsequently strikes a beam-splitter 4A and 4B. The beam-splitter splits each image path, directing approximately one half the light to the rear and allowing the other half of the light to continue on its original path. The unaltered path passes through a rear-focus conversion lens 5A and 5B to be focused on an image plane 6A and 6B. The image plane 6A and 6B is any imaging surface, including CCD devices, CMOS devices, camera film with shutter, cinema film with shutter, or any other imaging device existing now or to be invented in the future.

The rearward image path passes rough a rear-focus conversion lens 7A and 7B where it is further imaged by an ocular or ocular lens system 8A and 8B to focus on a human eye 9A and 9B for real-time viewing. The distance between 7A and 8A and between 7B and 8B can be altered by the user to adjust the focus for each eye for comfortable viewing.

The telescope lens system can be any type or focal length lens. When the rear focal length of the lens becomes long enough, the meniscus 2 can be omitted because the telescope lens will then take on the properties of an infinite rear focus lens. Examples of lenses such as in tube 1 include, but are not limited to: reflector telescope lenses, refractor telescope lenses, Schmidt-Cassegrain telescope lenses, telescopic periscope lenses, telephoto lenses, zoom telephoto lenses, long focal length surveillance lenses, and other optical classes of telescopic lenses.

That we show a prism 3 is not intended to be limiting. Clearly image light can be split in a wide variety of ways, such as by using mirrors or other appropriate reflectors or refractors. Mirrors are preferred when lower cost is desirable. A prism or prisms are preferred when mechanical stability and optical quality are preferred. In general the position of the prism 3 is preferred to be in mechanical contact with the meniscus 2. When mechanical or optical constraints interfere with this position, a position as close as possible to the meniscus is preferred. Typically, the meniscus is no more than about 15 mm and more typically no more than about 5 mm from the prism 3.

The meniscus 2 can be positioned outside or inside the tube 1. When it is inside, it must not be so far inside so as to eclipse light rays 10 or 12 after they are reflected from the prism 3. In general, the position of the meniscus 2 relative to the tube 1 will be dictated by the optical characteristics of the image projecting from the tube as indicated by the lines 10, 11, and 12.

Interocular adjustment is effected by grouping together mechanically parts 4A, 5A, 6A, 7A, and 8A, as indicted by 13A, and by grouping together mechanically parts 4B, 5B, 6B, 7B, and 8B, as indicated by 13B. Then by moving, sliding or rotating 13A and 13B together and apart, the user can adjust the interocular distance for comfortable viewing.

That we show simple lenses is not to be taken as limiting. It is well known that lenses, in actual practice, are composed of compound lenses that are achromatic with spherical aberration corrections to produce a sharp and clear image. This depiction as simple components is not intended, however, to be limiting because it is well known that more complex lens systems will produce a superior image. Any quality of lens system may nevertheless be employed in this invention and those skilled in the optic arts will be readily be able to employ lens systems of any desired quality.

Figure 2:
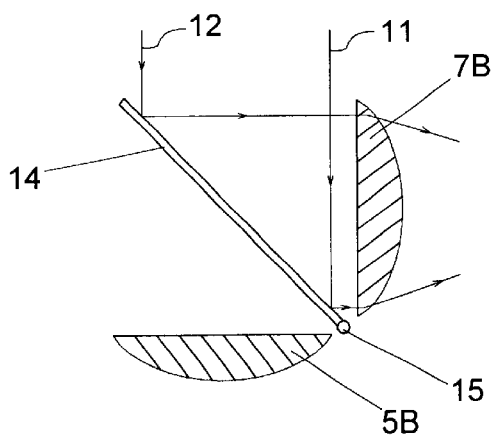
FIGS. 2 and 3 are plan views depicting different operational modes of a portion of an optical system according to a second embodiment.

FIG. 2 shows that the prism 4A and 4B of FIG. 1 can be replaced with a (full silvered) mirror 14 that can be moved into and out of position to allow video or left in place to allow live ocular viewing. FIG. 2 shows the mirror 14 in position to reflect the image, as depicted with lines 11 and 12, through the rear-focus conversion lens 7B, toward the oculars. This position sends at least most, and typically all, of the image to the eye 9B. In this position, the mirror blocks all or nearly all light from striking the rear-focus conversion lens 5B which means that little or none of the light is contacting imaging surface 6B. Accordingly, when the mirror 14 is in the position of FIG. 2, more light is passed to the ocular than to the rear-focus conversion lens 5B.

Figure 3:
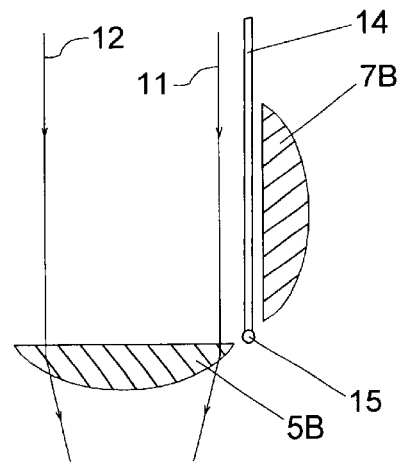

The mirror 14 pivots on pivot 15 so that it can rotate out of the light path as shown in FIG. 3. Here, the image light, as depicted by lines 11 and 12 bypasses the rear-focus conversion lens 7B and instead strikes the rear-focus conversion lens 5B for image capture. In this case, at least most, and typically all, of the light contacts imaging surface 6B and little or one of the light contacts eye 9B. The same configuration can be used in place of beam splitter 4A. Accordingly, when the mirror is in the position of FIG. 3, more light is passed to the rear-focus conversion lens 5B than is passed to the ocular.

That we depict the pivot 15 as being position on one end of the mirror 14 should not be taken as limiting. Clearly the mirror can pivot from either end and the choice of end will depend on the ultimate mechanical design of the invention. That the mirror pivots is not to be taken as limiting because mirrors can be moved into and out of position in a wide variety of manners. The mirror 14 can flip up or down, and slide into and out of position, and can have its reflectivity versus transmission characteristics changed electrically. No matter how the mirrors or reflective surfaces 14 are mechanically repositioned, all such variations shall still be considered a part of this invention.

That in FIGS. 2–3 we show mirrors 14 that are planar reflectors is not intended to be limiting because it is well known that reflecting surfaces can be constructed as non-planar surfaces that can act as lensing or focusing elements. In FIG. 1 we introduce a rear-focus conversion lens 5A, 5B, 7A, and 7B. That the reflectors 14 can be formed as focusing elements to eliminate the rear-focus conversion lens is also not to be limiting. A reflecting surface to augment or eliminate the rear-focus conversion lens can be utilized in this invention and those skilled in the optic arts will be readily able to employ non-planar reflectors or non-planar reflecting devices of any desired shape, quality, or construction.

Figure 4:
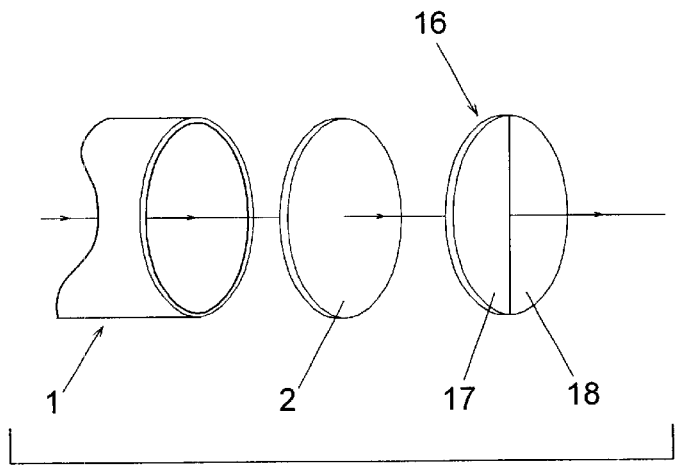
FIG. 4 is a plan view depicting a portion of an optical system according to a third embodiment.

FIG. 4 shows in exploded side view that an image signal encoding filter 16 can place the prism 3 of FIG. 1. The image signal encoding filter 16 must follow the ocular or camera port or tube 1 and the meniscus 2 just as did prism 3.

Figure 5:
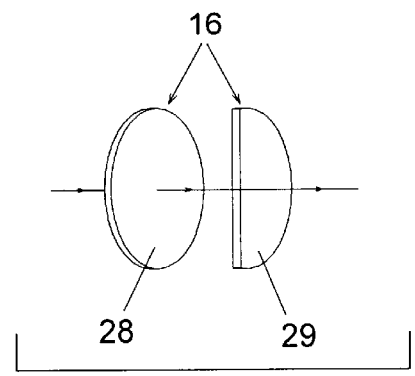
FIG. 5 is a plan view depicting a portion of an optical system according to a fourth embodiment.

An image signal encoding filter can be constructed using any of a wide range of previously disclosed methods. Among those methods are: The preferred filter as shown in FIG. 5, is constructed from a leading plane polarizer 28 which covers approximately the whole area of the light path, followed by a half-wave retarder 29 which occupies approximately one-half the image path; or as shown in FIG. 4, the image signal encoding filter 16 can be constructed from a plane polarizer 17 oriented one direction and a second plane polarizer 18 oriented approximately orthogonally opposite; or as shown in FIG. 4, the image signal encoding filter 16 can be constructed from a circular polarizer 17 of one handedness and a second circular polarizer 18 of the opposite handedness; or as shown in FIG. 4, the image signal encoding filter 16 can be constructed from an absorptive colored filter 17 of one color and a second absorptive colored filter 18 of a different color; or as shown in FIG. 4, the image signal encoding filter 16 can be constructed from a dichroic colored filter 17 of one color and a second dichroic colored filter 18 of a different color; or as shown in FIG. 4, the image signal encoding filter 16 can be constructed from an LC, electronic, or mechanical shutter 17 that allows and disallows light to pass at intervals and a second LC, electronic, or mechanical shutter 18 that allows and disallows light to pass at intervals opposite to the intervals of the first shutter 17; or an image signal encoding filter where part 17 is constructed using one of these methods, and part 18 is constructed using a different of these methods.

Figure 6:
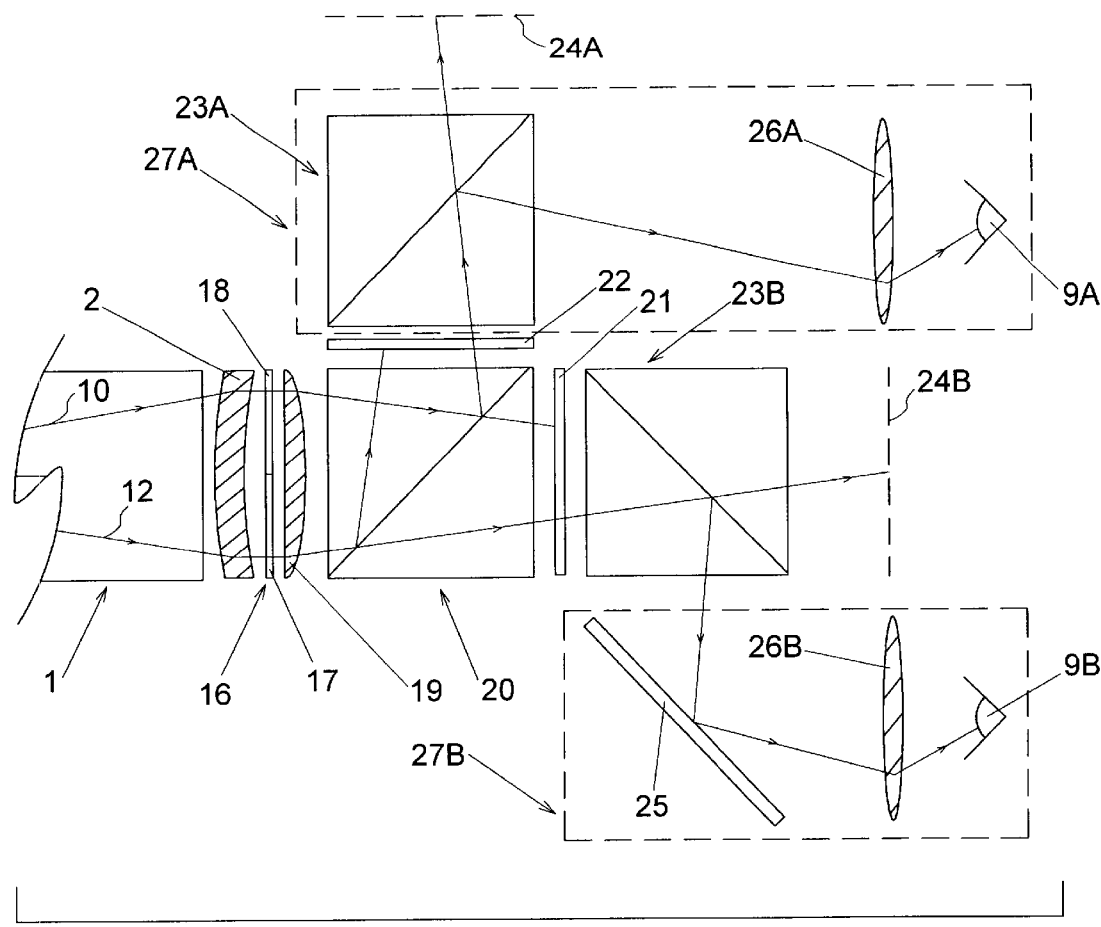
FIG. 6 is a plan view of an optical system according to a fifth embodiment.

FIG. 6 shows that a different arrangement of components is required when an image signal encoding filter 16 is used in place of the prism 3. The image signal encoding filter 16 is followed by a rear focus conversion lens 19 to minimize the amount of light path that must be traversed in a columnated form. Subsequent in the light path to the rear focus conversion lens 19, is a beam-splitter 20. This beam-splitter redirects about one half of the total light image 10 to the right (upward in the illustration) and allows the other half of the total light image 12 to pass through without diversion. Analyzing filters 21 and 22 follow the beam-splitter 20 in the light path. The analyzing filter 21 only allows the light image from side 17 of the image signal encoding filter 16 to pass through it, and blocks most or all of the light form side 18 of the image signal encoding filter 16. The analyzing filter 22 only allows the light image from side 18 of the image signal encoding filter 16 to pass through it, and blocks most or all of the light from side 17 of the image signal encoding filter 16. Thus, the polarizing orientations of analyzing filters 21, 22 are different and typically orthogonal for plane polarizing filters or opposite for circular polarizing filters.

Subsequent in the light path to the analyzing filters is a standard arrangement of beam-splitters and mirrors for binocular viewing. On the right side (top in the illustration) about one half the image signal information from image signal encoding filter's 16 side 18 is allowed to pass through to an image plane 24A, and the other half of the image signal information from image signal encoding filter's 16 side 18 is diverted toward the rear of the device (right in the illustration) to an ocular lensing system 26A that projects the image to eye 9A.

On the left side (bottom in the illustration) one half the image light from the analyzing filter 21 passes through a beam-splitter 23B where is subsequently focuses on an image plane 24B. The other half of the image light from analyzing filter 21 is diverted first by the beam-splitter 23B and subsequently by the mirror 25 to an ocular lensing system 26B that projects the image to eye 9B. The image planes 24A and 24B is any imaging surface, including CCD devices, CMOS devices, camera film with shutter, cinema film with shutter, or any other imaging device existing now or to be invented in the future.

That we illustrate a common beam-splitter arrangement is not to be taken as limiting, clearly two views of a common image stream can be created in a number of ways for binocular viewing. A Seidentopf arrangement is one common alternative. The replacement of beam-splitter prisms with half-silvered mirrors is another common alternative. The differentiation of one polarizing state from another can also be done with polarizing beam-splitters. Clearly many modifications of our base design can be made without altering the underlying principals that generate a 3D view simultaneously for both human eyes and image capture, and any such modifications or minor improvements shall still remain a part of this invention.

FIG. 6 also shows one possible grouping of elements. On the right side (top in the illustration) parts 23A and 26A are mechanically and optically joined. On the left side (bottom in the illustration) parts 25 and 26B are mechanically and optically joined. For both, the human eyes are 9A and 9B are included because it is the position of the eyes that drives the relationship between groupings 27A and 27B. By moving groupings 27A and 27B apart and together the invention allows the user to adjust for interocular distances.

That we show simple lenses is not to be taken as limiting. It is well known that lenses, in actual practice, are composed of compound lenses that are achromatic with spherical aberration corrections to produce a sharp and clear image. This depiction as simple components is not intended, however, to be limiting because it is well known that more complex lens systems will produce a superior image. Any quality of lens system may nevertheless be employed in this invention and those skilled in the optic arts will be readily be able to employ lens systems of any desired quality.

FIG. 2 shows that the prism 23A and 23B of FIG. 6 can be replaced with a mirror 14 that can be moved into and out of position. FIG. 2 shows the mirror 14 in position to reflect the image, as depicted with lines 11 and 12, toward the oculars. This position sends the full light of the image to the eyes. In this position, the mirror blocks all or nearly all of the light from striking the image plane.

The mirror 14 pivots on pivot 15 so that it can rotate out of the light path as shown in FIG. 3. Here, the image light, as depicted by lines 11 and 12, strikes the image plane.

That we depict the pivot 15 as being positioned and one end of the mirror 14 should not be taken as limiting. Clearly the mirror can pivot from either end and the choice of end will depend on the ultimate mechanical design of the invention. That the mirror pivots is not to be taken as limiting because mirrors can be moved into and out of position in a wide variety of manners. The mirror 14 can flip up or down, and slide into and out of position, and can have its reflectivity versus transmission characteristics changed electrically. No matter how the mirrors or reflective surfaces 14 are mechanically repositioned, all such variations shall still be considered a part of this invention.

Figure 7:
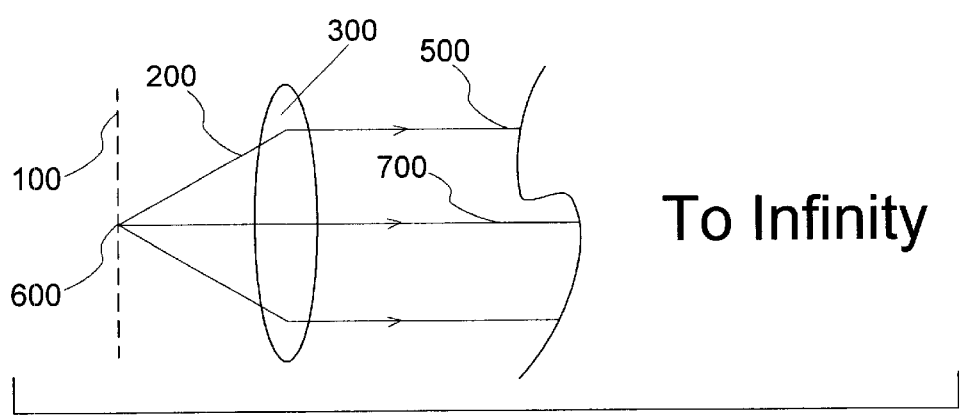
FIG. 7 shows a simplified infinity lens.

A number of configurations of infinity lenses can be employed in the various optical devices described above. FIG. 7 shows diagrammatically and representationally how such infinity lenses work. An object point 600 in the object plane 100 is imaged by hypothetical lens 300. The light rays 200 are gathered from the object point 600 by lens 300 and are projected by light rays 500 onto a point infinitely distant (which cannot be shown because of the limitations of paper).

When the hypothetical lens 300 is perpendicular to the principal ray (the main axis of light) 700 through the lens system, and when the object point 600 is on the principal ray, the output rays 500 are parallel to the principal ray.

Figure 8:
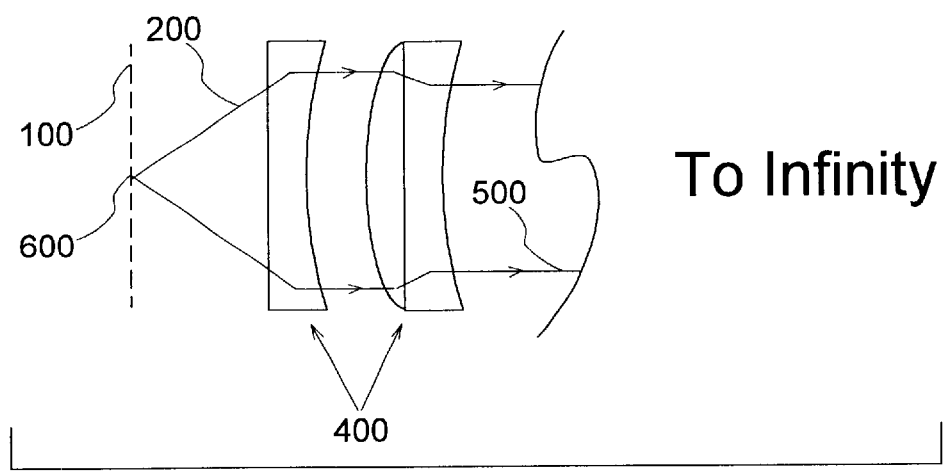
FIG. 8 shows a compound infinity lens.
Figure 9:
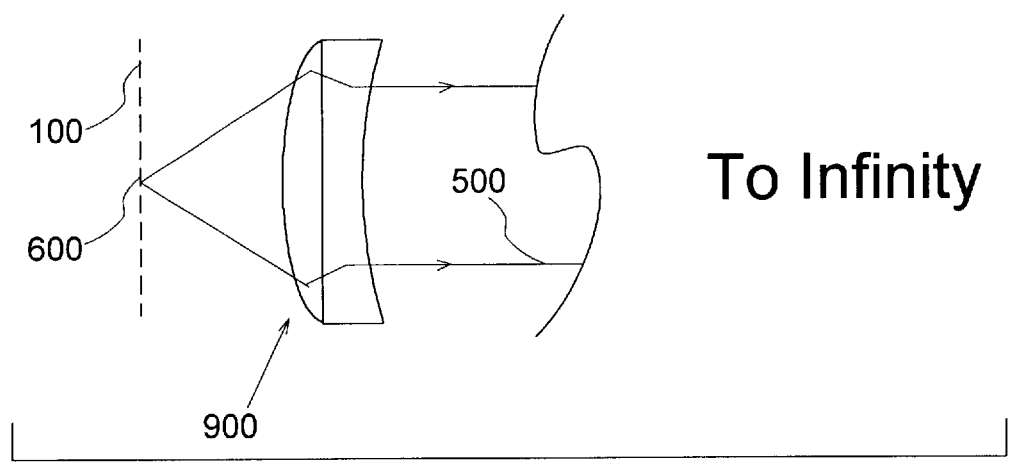
FIG. 9 shows a generic representation of an infinity lens.

FIG. 8 shows that the hypothetical lens 300 of FIG. 7 can be constructed of multiple lenses or lens elements 400 with coatings to help the lens assembly correct for chromatic and spherical aberrations. FIG. 9 shows a hypothetical lens 900 that represents a wide range of infinity lenses.

Figure 10:
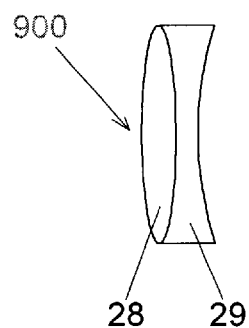
FIG. 10 is preferred macroscopic infinity lens according to a sixth embodiment.

FIG. 10 depicts a macroscopic infinity lens that is particularly useful as the rear-focus conversions lens(es) in the devices described above. FIG. 10 shows the preferred embodiment of a macroscopic infinity lens 900. First in the light path is a positive lens 28 of suitable front and rear focal distances to capture a real-world image upon a smaller imaging surface. Preferably, the front focal distance is at least the diameter of the positive lens. More preferably, the front focal distance is at least ten times the lens diameter. Following the positive lens 28 in the light stream is negative lens 29. Use of a negative lens causes the light image that would have been focused on the image plane to be instead to be focused on an image plane that is infinitely distant. Preferably, the rear focal distance of the front positive lens and the rear focal distance of the negative lens are selected such that the combined rear focal distance is at least substantially infinite.

That we show two lenses is not to be taken as limiting. In actual practice, lenses can be more or less complex than is shown. Multiple elements can be used for each of the positive and negative lenses to increase light transmission and resolution. Coatings can be added to each of the positive and negative lenses to suppress unwanted frequencies, and to suppress internal reflections. Any such improvements on this basic lens shall still be considered a part of this invention.

That we show a few arrangements of lens elements is not intended to be limiting, however, because in actual practice such lens systems are composed of compound lenses or multiple lens elements that are achromatic with spherical aberration corrections to product a sharp and clear image. This depiction as simple lenses is not intended to be limiting because it is well known that more complex lenses will produce a superior image. Any quality of lens may nevertheless be employed in this invention and those skilled in the optic arts will be readily able to employ lenses of any desired quality.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. An optical device, comprising:
   one or more first lenses to project radiation along a first optical path;
   at least a first dividing surface for dividing the projected radiation into first and second radiation portions;
   a negative meniscus positioned between the one or more first lenses and the first dividing surface, wherein the negative meniscus is operable to collimate the projected radiation;
   at least a second dividing surface for dividing the first radiation portion into first and second radiation segments;
   one or more second lenses for focusing the first radiation segment on an imaging surface, the imaging surface being a part of an image acquisition device; and
   one or more third lenses for focusing the second radiation segment for viewing by a user, whereby the user can view the image being acquired by the image acquisition device during acquisition thereof.

2. The optical device of claim 1, wherein the first dividing surface is one or more of a reflective surface, a refractive surface, or an encoder that causes each of the first and second radiation portions to have a different characteristic.

3. The optical device of claim 1, wherein the first optical path is transverse to second and third optical paths followed by the first and second radiation portions, respectively.

4. The optical device of claim 1, wherein the second dividing surface is one or more of a beam splitter, prism, and mirror.

5. The optical device of claim 1, wherein the one or more second lenses include a rear-focus conversion lens.

6. The optical device of claim 1, wherein the image acquisition device is one or more of a CCD device, a CMOS device, film and image orthicon tube.

7. The optical device of claim 1, wherein the one or more third lenses include a rear-focus conversion lens and an ocular.

8. The optical device of claim 7, wherein the distance between the rear-focus conversion lens and ocular is adjustable by the user.

9. The optical device of claim 1, wherein the second dividing surface, one or more second lenses, and one or more third lenses are movably disposed in the optical device for interocular adjustment.

10. The optical device of claim 3, wherein the first and second radiation segments follow fourth and fifth optical paths, respectively, and further comprising:
   a third dividing surface for dividing the second radiation portion into third and fourth radiation segments, the third and fourth radiation segments following sixth and seventh optical paths, respectively, the sixth and seventh optical paths being transversely oriented;
   one or more fourth lenses for focusing the third radiation segment on a second imaging surface, the second imaging surface being a part of a second image acquisition device; and
   one or more fifth lenses for focusing the fourth radiation segment for viewing by the user.

11. The optical device of claim 1, wherein the second dividing surface in a first operational mode forms the first and second radiation segments and in a second operational mode does not form the first and second radiation segments.

12. The optical device of claim 1, wherein the first and second radiation portions follow second and third optical paths, respectively, the second and third optical paths being in different locations and wherein the first and second radiation segments follow fourth and fifth optical paths, respectively, the fourth and fifth optical paths being transversely oriented.

13. The optical device of claim 1, wherein the first dividing surface is an encoder that includes at least two plane polarizers having differing polarization orientations, at least two circular polarizers having differing handedness, at least two color filters passing differing wavelength bands, at least two shutters passing radiation at differing intervals, and a retarder or other filter covering only a portion of the first optical path.

14. The optical device of claim 13, further comprising first and second analyzing filters positioned in a second optical path traversed by the first radiation segment and a third optical path traversed by the second radiation segment.

15. An optical device, comprising:
one or more first lenses to project radiation along a first optical path;
at least a first encoder for encoding the projected radiation into first and second radiation portions, the first and second radiation portions having a different characteristic;
a negative meniscus positioned between the one or more first lenses and the first encoder to collimate the projected radiation;
at least a first directing surface for directing the first and second radiation portions along second and third optical paths, respectively, the second optical path being transverse to the third optical path;
one or more second lenses for focusing the first radiation portion on an imaging surface, the imaging surface being a part of an image acquisition device; and
one or more third lenses for focusing the second radiation portion for viewing by a user, whereby the user can view the image being acquired by the image acquisition device during acquisition thereof.

16. The optical device of claim 15, wherein the first and second radiation portions follow a common optical path between the first encoder and the first directing surface.

17. The optical device of claim 16, wherein the optical path between the first encoder and the first directing surface is transverse to at least one of the first and second optical paths.

18. The optical device of claim 15, further comprising a meniscus positioned between before the first encoder.

19. The optical device of claim 15, wherein the first directing surface is one or more of a beam splitter, a mirror or another reflecting surface and a prism.

20. The optical device of claim 15, further comprising a rear-focus conversion lens positioned between the first encoder and the first directing surface.

21. The optical device of claim 15, wherein the image acquisition device is one or more of a CCD device, a CMOS device, film, and image orthicon tube.

22. The optical device of claim 15, wherein the first encoder includes at least two plane polarizers having differing polarization orientations, at least two circular polarizers having differing handedness, at least two color filters passing differing wavelength bands, at least two shutters passing radiation at differing intervals, and a retarder covering only a portion of the first optical path.

23. The optical device of claim 15, further comprising first and second analyzing filters positioned in the first and second optical paths, respectively.

24. The optical device of claim 15, further comprising a second directing surface for directing a first segment of the first radiation portion to the imaging surface and a second segment of the first radiation portion to an ocular and a third directing surface for directing a first segment of the second radiation portion to a second ocular.

25. A method for acquiring a stereoscopic image of an object, comprising:
(a) passing image radiation, containing image information relating to the object, through at least a first lens and a negative meniscus of an optical device;
(b) thereafter separating the image radiation into first and second radiation portions, wherein at least one of the following is true: (i) the first and second radiation portions traverse different optical paths and (ii) the first and second radiation portions have one or more differing characteristics;
(c) directing at least a portion of the first radiation portion to an imaging surface of an imaging device connected to the optical device; and
(d) directing at least a portion of the second radiation portion to an ocular of the optical device for viewing by a user.

26. The method of claim 25, wherein the separating step includes contacting the image radiation with at least one of the following: a beam splitter, a prism, a reflective surface, a shutter, and an encoder.

27. The method of claim 26, wherein the encoder is at least one of the following: at least two plane polarizers having differing polarization orientations, at least two circular polarizers having differing handedness, at least two color filters passing differing wavelength bands, at least two shutters passing radiation at differing intervals, and a retarder or other filter covering only a portion of the first optical path.

28. The method of claim 25, wherein in directing step (c) the at least a portion of the first radiation portion is passed through a rear-focus conversion lens.

29. The method of claim 25, wherein in directing step (d) the at least a portion of the second radiation portion is passed through a rear-focus conversion lens.

30. The method of claim 25, further comprising:
(e) directing another portion of the first radiation portion to another ocular for viewing by the user; and
(f) directing another portion of the second radiation portion to an imaging surface of another imaging device.

31. The method of claim 25, further comprising:
(e) directing another portion of the first radiation portion to another ocular for viewing by the user.

32. The method of claim 25, wherein the characteristic is at least one of intensity, phase, wavelength distribution, polarization, and frequency.

33. The method of claim 25, further comprising:
(e) viewing the at least a portion of the image information in the at least a portion of the second radiation;
(f) altering the position of the optical device based on the viewing step.

34. The method of claim 25, wherein in the separating step the image radiation is contacted with a reflective or refractive surface and further comprising:
(e) moving the reflective or refractive surface out of the optical path of the image radiation to direct at least substantially all of the image radiation to the ocular and at least substantially none of the image radiation to the imaging surface.

35. A method for acquiring a stereoscopic image of an object, comprising:
providing an optical device, comprising at least a first lens, at least one imaging surface, and at least one ocular;
configuring the optical device to operate in a first mode in which the following steps are performed:
(i) passing image radiation, containing image information relating to the object, through the at least a first lens of an optical device;
(ii) separating the image radiation into first and second radiation portions, wherein at least one of the following is true: (a) the first and second radiation portions traverse different optical paths and (b) the first and second radiation portions have one or more differing characteristics;
(iii) directing at least a portion of the first radiation portion to an imaging surface of an imaging device connected to the optical device; and (iv) directing at least a portion of the second radiation portion to an ocular of the optical device for viewing by a user wherein in the separating step the image radiation is contacted with at least one of a reflective and refractive surface;

configuring the device to operate in a second different mode in which the following steps are performed:
(i) passing the image radiation, containing image information relating to the object, through the at least a first lens of the optical device;
(ii) directing image radiation to the at least one ocular; and
(iii) not directing image radiation to the imaging surface.

36. The method of claim 35, further comprising in the second mode the step of moving the at least one of a reflective and refractive surface out of the optical path of the image radiation.

37. The method of claim 35, wherein the at least a first lens comprises a negative meniscus.

38. The method of claim 35, wherein in the second mode at least most of the image radiation is directed to the at least one ocular.

39. The method of claim 35, wherein the first and second modes are performed at different times.

* * * * *